Feb. 18, 1930.   N. J. LANDAR   1,748,022
AUTOMATIC GAS CUT-OFF
Filed Nov. 15, 1926

INVENTOR
NATHAN J. LANDAR
BY
Warren S. Orton
ATTORNEY

Patented Feb. 18, 1930

1,748,022

UNITED STATES PATENT OFFICE

NATHAN J. LANDAR, OF NEW YORK, N. Y.

AUTOMATIC GAS CUT-OFF

Application filed November 15, 1926. Serial No. 148,602.

The invention relates in general to an automatic gas cut-off of general application and the invention particularly relates to time controlled mechanisms for automatically shutting off a gas supply at the end of a present lapse of time. More definitely defined, the invention relates to an improvement in controls for automatically shutting off the supply of gas to one or more of the different burners in a domestic gas range and the invention also relates to that type of such control which the house wife can set, so as to open or close the controlling valve, or partially to open the same at the end of different periods of time, preselected for each operation of the different burners in action and under control of the device herein featured.

Heretofore such time regulated shut off devices have been actuated by some form of clock mechanism. Such constructions have several disadvantages, among which might be mentioned that any suitable form of clock is expensive; it takes up more room than is available in the space apportioned on the usual kitchen range for each of the burner connections, and the extreme variations of temperature usually present seriously affect the accurate operation of any form of clock which could be used for this purpose.

The primary object of the present invention is to provide a simple, easily and cheaply manufactured form of control which can be readily set to shut off or otherwise change the present condition of the valve, so that it will function at the termination of different intervals of time selected by the operator and which at the same time will avoid the objections inherent in known forms of clock controlled devices.

Broadly, I attain this phase of the invention by utilizing the gas flow itself as a meter to measure the desired lapse of time during which it is desired that the flow should continue and to utilize the power inherent in the flow for the purpose of inaugurating the closing of the controlled valve.

Various other objects and advantages of the invention will be in part obvious from an inspection of the accompanying drawings and in part will be more fully set forth in the following particular description of one form of device embodying my invention, and the invention also consists in certain new and novel features of construction and combination of parts hereinafter set forth and claimed.

In the accompanying drawing.

Figure 1:
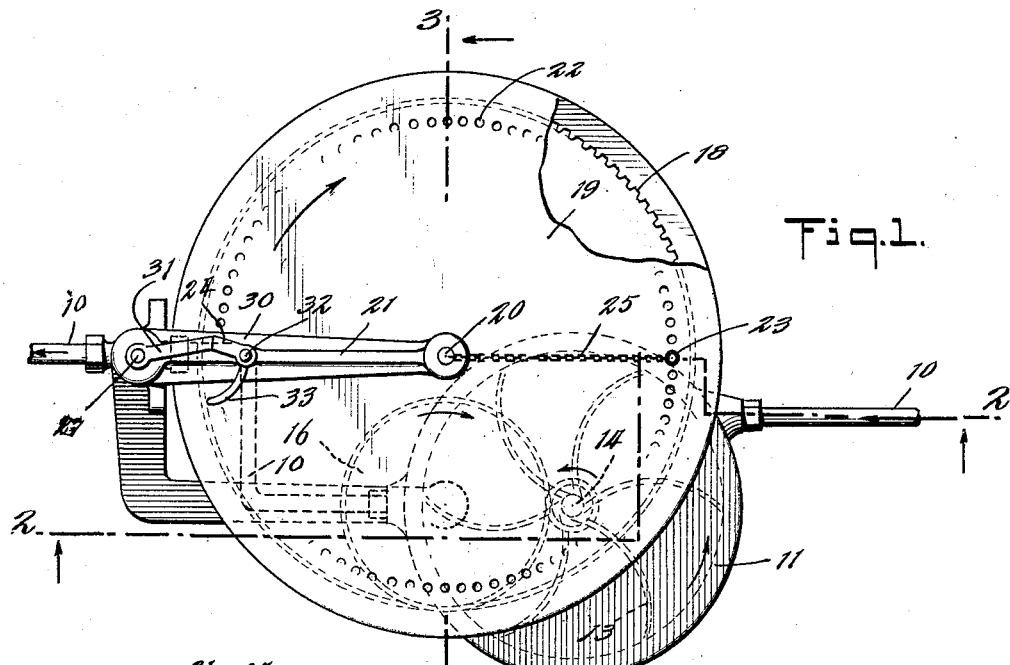
Fig. 1 is a plan view looking down upon a preferred embodiment of my invention including part of the gas line which it is intended to control and with parts broken away to show internal construction.
Figure 2:
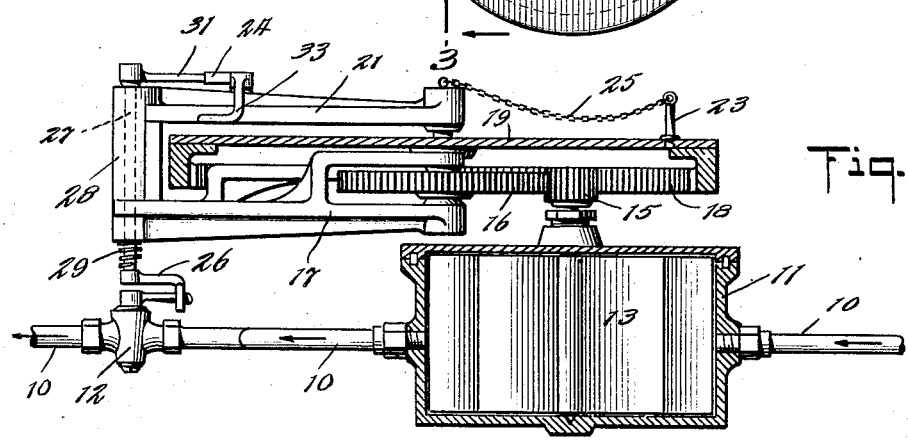
Fig. 2 is a vertical sectional view taken on the irregular line 2—2 of Fig. 1 looking in the direction indicated by the arrows.
Figure 3:
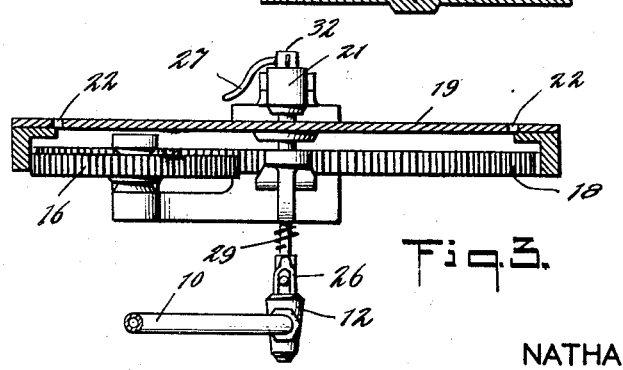
Fig. 3 is an enlarged view particularly showing the time plate and actuating gear train and taken on the line 3—3 of Fig. 1 looking in the direction indicated by the arrows.

In the drawing there is shown a gas line 10 including a turbine casing 11 through which the gas is passed in the direction indicated by the arrows. Beyond the turbine is a valve 12 which for the purpose of this disclosure may be regarded as a conventional form of valve usually employed in gas ranges and similar domestic heating equipment. A turbine wheel 13 is mounted for rotary movement in the casing 11 and is fixed to a turbine shaft 14 which projects above the casing 11. The shaft 14 is provided at its upper end with a pinion 15 constituting the first element of a reducing gear train. The pinion meshes with an intermediate gear 16 rotatably mounted in a bracket 17 which together with its associated parts may be regarded as an article of manufacture constituting an attachment to the gas line. The gear 16 in turn meshes with an internal rack 18 depending from the underside of a time plate 19 in turn rotatably supported on stub shaft 20 depending from an upper arm 21 forming part of the bracket 17. This gear connection thus constitutes a reducing gear drive between the turbine wheel 13 and the time plate 19. The gear ratios are so arranged that a relatively large number of rotations of the turbine wheel causes a relatively small angular movement of the time plate 19.

The time plate is provided adjacent its periphery with a plurality of circumferentially spaced pin apertures 22. It can be readily understood that the larger the diameter of the plate the greater number of apertures may be provided and in this way extreme refinement may be obtained in measuring the lapse of time before the valve is shut off. However, it will be appreciated that space limitation will restrict the possible size of the time plate and dependence will therefore have to be made in the character of gear drive to insure accuracy in the duration of lapsed time before the valve is actuated. A shiftable pin 23 is provided which may be selectively placed in any one of the apertures; it being understood that as the time plate rotates clockwise the nearer the pin is positioned to the releasing latch 24 hereinafter described, the shorter will be the time lapse before the valve is actuated. The pin 23 is secured to the bracket arm 21 by a flexible connection 25 to prevent loss or displacement of the pin.

The valve 12 is controlled by a crank 26, the shaft 27 of which is mounted in a bearing 28 forming part of the bracket 17. A coiled spring is mounted on the shaft 27 and is connected with the crank 26 and tends normally to move the valve from its open into a closed position. The valve is held in its open position and against the tendency of the spring 29 to close the same by means of the tripping latch 30 having its end beveled which engages a beveled end of a stop finger 31 projecting from the upper end of the shaft 27 as particularly shown in Fig. 1. The tripping latch is in the form of a bell crank lever pivotally mounted on pin 32 and with an arm 33 disposed in the path of movement of the revolving pin 23. The distance between the axis of shaft 27 and lever pin 32 is less than the combined length of finger 31 and arm 24 so that when the beveled ends are in engagement as shown in Fig. 1 there is formed a toggle lock securing the valve in open position and against the tension of spring 29.

In operation and assuming that the device is installed to control the gas flow as for instance the flow to the oven of a gas range, the operator will move the arm 31 into position to open the valve and incidentally to place the spring 29 under tension. The latch 30 is then swung into position to engage the beveled end of stop finger 31 and thus hold the valve in its open position. The latch tripping pin 23 is located in that aperture selected by the operator which will insure the shutting off of the gas at the termination of the desired time. It will be understood that the apertures are suitably designated in terms of time units for each particular device. In the instant case the time plate is designed to be rotated once an hour and is provided with sixty minute apertures so that the gas flow may be shut off at any one of the sixty minutes. The flow of gas through the gas line causes the turbine wheel to rotate and this in turn acting through the reducing gear drive causes the time plate to revolve the pin towards and finally into engagement with the latch.

The final action of the turbine wheel is to cause the pin to be forced into bearing engagement with the latch, tripping the same in a clockwise movement about its pivot pin 31 and thus permitting the spring 29 to react and close or otherwise change the present condition of the valve. When it is desired to again set the control for another operation, the pin is withdrawn, the latch 24 and finger 31 are reset in their mutual holding position shown in Fig. 1 and the pin placed in that aperture which will insure the desired time lapse before the pin comes into releasing engagement with the latch 24.

By means of a device of the class described, it is possible to attain a fairly accurate timing of the permissible gas flow without necessity of depending upon an expensive form of clock mechanism. When released the valve is held positively secured in its closed position and this may be attained even before the actuation of the automatic control by the operator manually tripping the latch in case it should be desired for any reason to temporarily intercept the gas flow. Such operation would of course not effect the previously set automatic closing mechanism which can be restored to active control by resetting the tripping latch. From a commercial standpoint, the disclosure has the advantage of economy in construction and there is provided a structure which can be made sufficiently small to be accommodated within the space available on a gas range. The device when in use is in no way influenced by the presence of heat or by variation of temperature in the vicinity and the heat present has no effect on the timing device as it derives its energy solely from the gas flow which it controls.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In an automatic gas cut-off, the combination with a gas line containing a turbine wheel provided with a pinion and a valve for controlling the flow in the line, of an attachment comprising a bracket, spring controlled means rotatably mounted in the bracket and adapted to be connected to the valve for shutting off the same, a tripping latch for securing said means in position to hold the valve open, a plate mounted in the bracket for rotary movement and provided with means for releasing said tripping latch, and a gear train carried by the bracket, the last element of the gear train connected to the plate to rotate the same and the first element meshing with the pinion of the turbine to be turned thereby.

2. In an automatic gas cut-off, the combination of a bracket, a shaft rotatably mounted in the bracket, a valve controlling crank secured to the shaft, a spring acting on the shaft to move the crank, a stop finger projecting laterally from the shaft, a tripping latch pivoted to the bracket and adapted to engage the stop finger to hold the shaft against the tension of said spring and means for engaging the latch to cause the same to release the finger.

3. In an automatic gas cut-off, the combination of a supporting bracket, a gear train carried thereby, the last element of the gear train being an internal gear enclosing the other elements of the gear train within its outline, a valve control carried by the bracket, a pivotally mounted tripping latch for releasing said control, and means actuated by the internal gear for engaging said tripping latch and thus cause it to release the control.

4. In an automatic gas cut-off, the combination of a bracket, a valve controlling shaft provided with a laterally extending stop finger having a bevelled end, a bell crank lever constituting a tripping latch, one arm of the bell crank lever being bevelled and said bevelled ends adapted to interengage, the distance between the axis of the shaft and of the tripping lever being less than the combined length of said finger and arm, and means for engaging the other arm of the bell crank lever for moving the first named arm out of holding engagement with said finger.

5. In an automatic gas cut-off, the combination of a gas line, a valve for controlling the flow in said line, valve actuating means tending normally to hold the valve in closed positions, setting means for holding said actuating means in a position where the valve is open, a rotatable plate having a spaced circumferential row of apertures so mounted that the row of apertures will pass adjacent said setting means, a removable pin adapted to be placed in one of said apertures and to contact with said setting means to trip same, an internal gear carried on one side of said plate, said gas line containing a turbine wheel having a shaft with its axis positioned within the outline of the internal gear and a reducing gear train between the shaft and said internal gear, said gear train being confined to the space within the outlines of the internal gear.

Signed at New York in the county of New York and State of New York this first day of November, A. D. 1926.

NATHAN J. LANDAR.